Nov. 3, 1936.  E. A. MASSA, JR  2,059,594

ELECTRICAL MEASURING INSTRUMENT

Filed April 2, 1935

INVENTOR
Ernest A. Massa, Jr.

Patented Nov. 3, 1936

2,059,594

UNITED STATES PATENT OFFICE 2,059,594

ELECTRICAL MEASURING INSTRUMENT

Ernest A. Massa, Jr., Haddon Heights, N. J., assignor of fifty-five per cent to Frank Massa, West Collingswood, N. J.

Application April 2, 1935, Serial No. 14,195

9 Claims. (Cl. 171—34)

My invention is concerned with electric meters and more particularly with wattmeters for measuring power in audio frequency circuits. The well known electrodynamometer type wattmeter that is widely used in commercial power measurements cannot be used at the higher audio frequencies due to the increased inductive reactance that appears in the potential coil at these frequencies. For a particular frequency it is possible to neutralize this inductive reactance by placing a suitable condenser in series with the potential coil, however, to use the meter for the complete range of audio frequencies introduces serious practical limitations which are very obvious.

A wattmeter to be used in audio frequency circuits must operate accurately at any frequency within its range and, from a practical standpoint, must be free of accessories or adjustments throughout its working range of frequencies. I shall disclose below a wattmeter that possesses these advantages. My description will be read in conjunction with the following figures.

Figure 1:
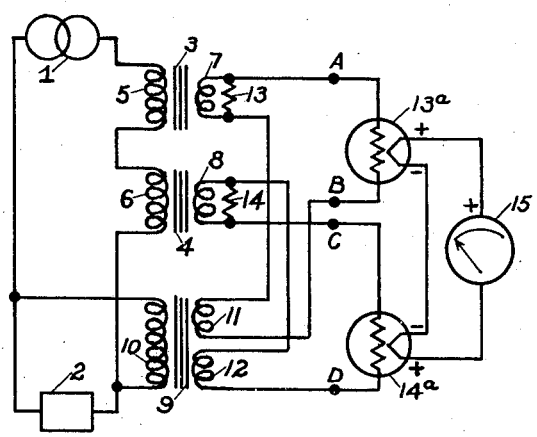
Fig. 1 shows an arrangement for measuring power in an audio frequency circuit.

Referring to Fig. 1, I is an oscillator supplying power to a load 2 which consists of a complex impedance. In series with the load are placed two identical current transformers 3 and 4 having primary windings 5 and 6 and secondary windings 7 and 8. Across each secondary is connected a resistor 13 and 14 as shown, which serves to load the transformers. Across the load 2 is connected a voltage transformer 9 having a primary winding 10 and two identical secondary windings 11 and 12. One secondary winding 11 is connected in series aiding with the secondary winding 7 and the sum of the two secondary voltages appears at AB across the heater of the thermocouple 13ª. The other secondary 12 is connected in series opposing with the secondary 8 and the difference of the two secondary voltages appears at CD across the heater of a second identical thermocouple 14ª. The D. C. outputs from the thermocouples are connected in series opposing so that the difference in the D. C. voltages is read on the D. C. millivoltmeter 15. I shall now show that the reading of the meter 15 is proportional to the audio power supplied to the complex load 2.

Let the instantaneous voltage across the load 2 in Fig. 1 be expressed by $e_L$ and the instantaneous current by $i_L$.

If the voltage $e_L$ appears across the primary 10, the voltage in each of the secondaries 11 and 12 may be expressed by $$e_{S1} = K_1 e_L \quad (1)$$

where $e_{S1}$ = instantaneous voltage across each of the secondaries 11 and 12
$K_1$ = a constant Since the current $i_L$ passes through the primaries 5 and 6, the voltage in each of the secondaries 7 and 8 may be expressed by $$e_{S2} = K_2 i_L \quad (2)$$

where $e_{S2}$ = instantaneous voltage across each secondary 7 and 8
$K_2$ = a constant Since, as I have already explained, the sum $(e_{S1} + e_{S2})$ is impressed across one thermocouple heater and the difference $(e_{S1} - e_{S2})$ is impressed across the other thermocouple heater; the voltmeter 15, which reads the difference of the thermocouple outputs, each output of which is proportional to the average square of the applied voltage, will give a reading that may be expressed as, $$R = \frac{1}{T}\int_0^T [(e_{S1}+e_{S2})^2 - (e_{S1}-e_{S2})^2]dt \quad (3)$$

which can be written $$R = \frac{4}{T}\int_0^T e_{S1} e_{S2} dt \quad (4)$$

where R = D. C. meter reading,
T = time for one complete cycle

Substituting the values of $e_{S1}$ and $e_{S2}$ from equations (1) and (2) it follows that $$R = K_3 \frac{1}{T}\int_0^T e_L i_L dt \quad (5)$$

where $K_3$ = a constant

I shall now show that the D. C. meter reading R in Equation (5) is proportional to the audio power dissipated in the complex load for both sinusoidal and complex wave shapes in the audio voltage and current.

First I shall take the sinusoidal case in which the instantaneous audio voltage may be expressed by $$e_L = E_m \sin \omega t \quad (6)$$

and the instantaneous current by $$i_L = I_m \sin(\omega t + \theta) \quad (7)$$

where:

$E_m$ = max. instantaneous voltage
$I_m$ = max. instantaneous current
$\omega = 2\pi f$, $f$ = frequency of audio source
$\theta$ = phase angle between voltage and current Substituting (6) and (7) in (5) the meter reading becomes $$R = K_3 \frac{1}{T}\int_0^T E_m I_m \sin \omega t \sin (\omega t + \theta) dt \qquad (8)$$

$$R = K_3 \frac{1}{T}\int_0^T \frac{E_m I_m}{2}[\cos \theta - \cos (2\omega t + \theta)] dt \qquad (9)$$

The definite integral of $\cos(2\omega t + \theta) dt$ over a complete cycle is zero thus leaving for the meter reading $$R = K \frac{E_m I_m}{2} \cos \theta \qquad (10)$$

where K = a constant
Since $$\frac{E_m I_m}{2}$$

$\cos \theta$ is the well known expression for power in an A. C. circuit, Equation (10) shows that the meter 15 in Fig. 1 will read directly proportional to the power dissipated in the load if the voltage and current are sinusoidal.

If the voltage and current contain harmonics, $e_L$ and $i_L$ may be expressed as follows:

$$e_L = E_{m1} \sin \omega t + E_{m2} \sin 2\omega t + E_{mn} \sin n\omega t \qquad (11)$$
$$i_L = I_{m1} \sin (\omega t + \theta_1) + I_{m2} \sin (2\omega t + \theta_2)$$
$$I_{mn} \sin (n\omega t + \theta_n) \qquad (12)$$

where: $E_{m1}$ = max. value of fundamental voltage component
$E_{m2}$ = max. value of 2nd harmonic voltage component
$E_{mn}$ = max. value of nth harmonic voltage component
$\omega = 2\pi f$, $f$ = fundamental frequency
$I_{m1}$ = max. value of fundamental current component
$I_{m2}$ = max. value of 2nd harmonic current component
$I_{mn}$ = max. value of nth harmonic current component
$\theta_1$ = phase angle between fundamental components of voltage and current
$\theta_2$ = phase angle between 2nd harmonic components of voltage and current
$\theta_n$ = phase angle between nth harmonic components of voltage and current Substituting (11) and (12) in (5), the meter reading becomes $$R = K_3 \frac{1}{T}\int_0^T [E_{m1} I_{m1} \sin \omega t \sin (\omega t + \theta_1) +$$
$$E_{m2} I_{m2} \sin 2\omega t \sin (2\omega t + \theta_2) +$$
$$E_{mn} I_{mn} \sin n\omega t \sin (n\omega t + \theta n) +$$
$$\text{product terms of unlike frequencies}] dt \qquad (13)$$

In evaluating the definite integral of Equation (13) the integral of the "product terms of unlike frequencies" becomes zero and the result becomes $$R = K \left[ \frac{E_{m1} I_{m1}}{2} \cos \theta_1 + \frac{E_{m2} I_{m2}}{2} \cos \theta_2 + \frac{E_{mn} I_{mn}}{2} \cos \theta_n \right] \qquad (14)$$

which is the well known expression for the power dissipated in an A. C. circuit in which harmonics are present in the voltage and current. Thus Equation (14) shows that if harmonics are present the D. C. meter reading will still be directly proportional to the true power dissipated in the load.

It has been assumed in this discussion that the power taken by the voltage transformer circuit in Fig. 1 is negligible as compared to the power taken by the load 2. Strictly speaking, the meter reading will include the power taken by the voltage transformer circuit and if this is appreciable (as may be the case when measuring very small load powers) it can simply be subtracted from the meter reading in order to get the true load power; the same as is usually done in conventional wattmeter measurements.

The reason why the circuit which I have shown in Fig. 1 operates as a wattmeter is due to the fact that each thermocouple gives a D. C. output proportional to the average square of the audio current flowing through its heater element. It is well known that thermocouple meters are rather sluggish in operation and therefore cannot be made to follow rapid variations in current or voltage. This sluggishness is of no particular disadvantage in most cases; however, in some instances it is desirable to follow more or less rapid variations in audio signals in which case some quicker acting meter other than the thermocouple type is more desirable.

Figure 2:
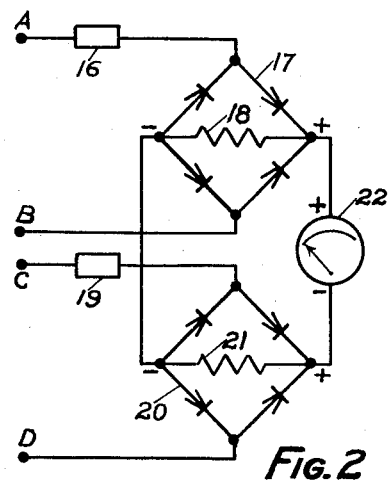
Fig. 2 shows an alternative arrangement that may be used to terminate the circuit of Fig. 1 at the points ABCD.

In Fig. 2 I have shown a circuit which may be substituted for the thermocouple circuit of Fig. 1 at the points ABCD and will result in a wattmeter which has much less inertia than the thermocouple arrangement and thus permits a more rapid following of any variations in audio frequency power being supplied to the load.

Referring to Fig. 2, there are two identical circuits, one across AB and the other across CD, each consisting of the material 16 and 19 whose resistance varies as a particular function of the current through it, a full wave rectifier 17 and 20, a resistor 18 and 21 and a D. C. millivoltmeter 22 connected to read the difference in the rectified voltages appearing across resistors 18 and 21.

If the material 16 and 19 offers a resistance which varies inversely as the square root of the absolute instantaneous value of current through it and if the absolute value of its resistance is always large compared with the resistance offered by the rectifier units 17 and 20 combined with their respective resistors 18 and 21, it is obvious that the rectified voltages appearing across the resistors 18 and 21 will be proportional to the average square of the audio frequency voltages applied across AB and CD respectively.

Thyrite is a material described by McEachron in U. S. Patent 1,822,742 and it is shown that the electrical property of the material can be expressed by the relation $$RI^a = C \qquad (15)$$

where R = resistance of the material
I = current through material
$a$ and C = contants which may be controlled in the manufacture of the material.

If a piece of thyrite is used for the material 16 and 19 with the exponent $a$ in Equation (15) chosen equal to ½ and the constant C made such that the resistance of the material is always larger than the resistance of the rectifier unit 17 or 20 combined with the resistor 18 or 21, it follows that the voltmeter 22 will read directly proportional to the power supplied to the load as was the case in Fig. 1 where the thermocouples were used. The only difference existing in the circuit of Fig. 2 is that the meter will follow the variations in audio frequency power much more rapidly than the circuit shown in Fig. 1, due to the lack of any thermal phenomenon existing in the arrangement shown in Fig. 2.

Figure 3:
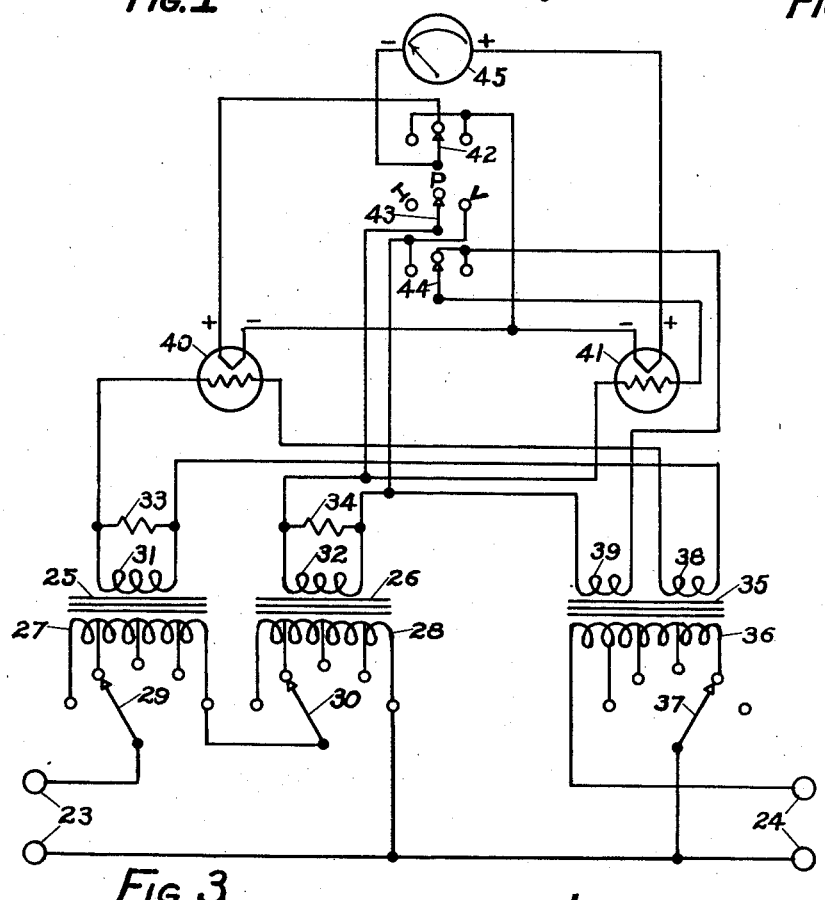
Fig. 3 shows a complete circuit for a universal, multi-range, audio-frequency meter that can be be used for measuring current, power or voltage in an audio frequency circuit.

In Fig. 3 I have shown the circuit arrangement which I have incorporated in an experimental model of the meter which I have built and found to operate satisfactorily in audio frequency circuits. In this arrangement I have incorporated the principle described in Fig. 1 to make a universal multi-range audio frequency meter which is capable of measuring current, power or voltage in an audio frequency circuit.

A pair of binding posts 23 are connected in series with the load and another pair 24 are connected across the load in the same way that the primaries 5 and 6 and 10 are connected in Fig. 1. Two identical current transformers 25 and 26 with tapped primaries 27 and 28 are connected in series through two tapped switches 29 and 30 as shown in Fig. 3. The switches 29 and 30 are mounted on a common shaft so that both transformers have the same number of primary turns in the circuit for any switch position. The tapped switches 29 and 30 permit different full scale current sensitivities for the instrument, which values may be marked on the panel on which the switch is mounted.

The voltage terminals 24 are connected through a tapped switch 37 to the tapped primary 36 of the voltage transformer 35. Each switch position represents a different full scale voltage sensitivity for the instrument, which values may also be marked on the panel, on which 37 is mounted.

The voltage transformer 35 has two identical secondaries 38 and 39. Each current transformer has an identical secondary 31 and 32 across each of which is connected an identical loading resistor 33 and 34 as shown. The winding 31 is connected in series opposing with the winding 38 and the difference of the two voltages is impressed across the heater element of the thermocouple 40.

Three triple contact switches; 42, 43 and 44 are mounted on a common shaft so that all three may be moved simultaneously to the position I, P or V. With the switches in the position P, as shown, the winding 32 is connected in series aiding with the winding 39 through switch 44 and the sum of the two voltages appears across the heater element of the thermocouple 41 which is identical with the thermocouple 40. At the same time the plus side of the output of the thermocouple 40 is connected through the switch 42 to the minus side of the D. C. milli-voltmeter 45. The minus side of the thermocouple 40 is connected to the minus side of thermocouple 41 and the plus side of 41 is connected to the plus side of the meter 45. For this connection, the meter 45 will read the same as the meter reads in Fig. 1, which is proportional to the power supplied to the load. The switch 37 is set to the desired voltage range and the double switch 29 and 30 is set to the desired current range during the measurement thus permitting the instrument to be used under widely varying circuit conditions.

If the multiple switch 42, 43 and 44 is moved to the left to the position I, the meter 45 will become connected across the output of only the thermocouple 41 through the switch 42 and at the same time only the secondary 32 is impressed across the heater of 41 as can be seen by following the wiring diagram through the switch 44. At this position I, therefore, the voltmeter 45 indicates only the value of the A. C. current flowing through the load circuit. The tapped switch 30 provides the possibility of various full scale current sensitivities.

If the multiple switch 42, 43 and 44 is moved to the right so that it is in position V, the meter 45 is still connected through 42 across the output of the single thermocouple 41 whose heater is now supplied only with voltage from the winding 39. The secondary 32 of the current transformer 26 that appears in series with the voltage transformer secondary 39 is short circuited by switch 43. Thus, in this position V, the meter 45 gives an indication of the A. C. voltage across the terminals 24. The tapped switch 37 permits various full scale voltage sensitivities.

I have described the arrangement shown in Fig. 3 and have shown that it results in a universal multi-range meter which is capable of measuring current, power or voltage over a wide range of values in audio frequency circuits.

Although the description of Fig. 3 has been given with thermocouples in the measuring circuit it is of course possible to substitute the arrangement of Fig. 2 for the thermocouples as previously described, in which case a meter of low inertia will result which can follow fluctuating voltages and currents with much greater rapidity.

I claim as my invention:

1. In an alternating current meter, means for producing a D. C. voltage proportional to the average square of the sum of two alternating voltages, one being proportional to the load voltage, and the other being proportional to the load current, means for producing a second D. C. voltage proportional to the average square of the difference between two alternating voltages, one being proportional to the load voltage and the other being proportional to the load current, and means for indicating the difference between the two D. C. voltages.

2. An alternating current wattmeter comprising a combination of current and voltage transformers in which two equal independent alternating voltages are produced proportional to the instantaneous load current and two more equal independent alternating voltages are produced which are proportional to the instantaneous load voltage, a circuit for producing two D. C. voltages, one proportional to the mean square sum of two of the alternating voltages (one proportional to the load current and the other proportional to the load voltage) and another D. C. voltage proportional to the mean square difference of the other two alternating voltages and a D. C. meter for reading the difference of the two D. C. voltages.

3. An alternating current wattmeter comprising two current transformers having identical primary and secondary windings whose primaries are connected in series with the load under test, a voltage transformer with two identical secondary windings whose primary is placed across the load under test, one current transformer secondary connected in series aiding with a voltage transformer secondary and in series with a thermocouple heater element, and the other two secondaries connected in series opposing and in series with the heater element of a second identical thermocouple; the D. C. outputs from the thermocouples connected in series opposing across a D. C. indicating meter, the deflections of said meter being directly proportional to the power consumed in the alternating current circuit.

4. An alternating current meter comprising two current transformers with identical primary and secondary windings whose primaries are inserted in series with the load under test, a voltage transformer with two identical secondary windings whose primary is connected across the load under test, one secondary from a current transformer connected in series aiding with a voltage transformer secondary and in series with a material whose resistance varies inversely as the square root of the current through it and said circuit terminated by a rectifier, the other two secondaries connected in series opposing and in series with a material whose resistance varies inversely as the square root of the current through it and said circuit terminated by a rectifier, means for reading the difference in the rectified outputs from each circuit, said means consisting of a D. C. indicating device, the deflection of which is a measure of the power dissipated in the alternating current circuit.

5. A universal multi-range alternating current meter for measuring either voltage, a current or power comprising a pair of binding posts to be connected as an ammeter in an A. C. circuit and a pair of binding posts to be connected as a voltmeter in the same circuit, the ammeter terminals connected in series with a pair of identical variable ratio current transformers through a tapped switch and the voltmeter terminals connected to a variable ratio voltage transformer with two identical secondary windings through another tapped switch, a switching arrangement whereby either a current transformer secondary or a single voltage transformer secondary can be connected across a circuit capable of indicating the root mean square value of either secondary voltage depending on the position of the switch, and a third switch position which causes a secondary of the voltage transformer to be placed in series aiding with the secondary of a current transformer and the combination across a circuit capable of producing a D. C. voltage proportional to the average square of the sum of the two components and the other two secondaries are at the same time connected in series opposing across a similar circuit capable of producing a D. C. voltage proportional to the average square of the difference of the two components while simultaneously the said third switch position causes a D. C. meter to be connected to show the difference between the two D. C. voltages.

6. In combination in alternating current wattmeter, means for producing an alternating voltage proportional to the instantaneous sum of the load current and load voltage in an alternating current circuit, means for producing a second alternating voltage proportional to the instantaneous difference of the load current and load voltage in the same circuit, means for producing two electrical quantities, one quantity being proportional to the mean square value of one of the alternating voltages and the second quantity being proportional to the mean square value of the second alternating voltage and means for indicating the difference of these quantities.

7. In combination in an electrical circuit, a rectifier, a material whose resistance varies inversely as the square root of the current through it, and means for reading the rectified output.

8. An alternating current meter in which the current or voltage to be measured is supplied to a rectifier in series with a material whose resistance varies inversely as the square root of the current through it, the rectified output being indicated by a deflection on a D. C. meter.

9. An alternating current meter in which the alternating current or voltage to be measured is passed through a transformer to a rectifier in series with a material whose resistance varies inversely as the square root of the current through it, the rectified output being indicated by a deflection on a D. C. meter.

ERNEST A. MASSA, Jr.